United States Patent
Fournier

(10) Patent No.: US 9,803,131 B2
(45) Date of Patent: Oct. 31, 2017

(54) OIL AND GAS WELL PROPPANTS OF SILICONE-RESIN-MODIFIED PHENOLIC RESINS

(71) Applicant: Wacker Chemical Corporation, Adrian, MI (US)

(72) Inventor: Frances Marie Fournier, Ypsilanti, MI (US)

(73) Assignee: Wacker Chemical Corporation, Adrian, MI (US)

( * ) Notice: Subject to any disclaimer, the term of this patent is extended or adjusted under 35 U.S.C. 154(b) by 880 days.

(21) Appl. No.: 13/667,062

(22) Filed: Nov. 2, 2012

(65) Prior Publication Data

US 2014/0124200 A1 May 8, 2014

(51) Int. Cl.
*C09K 8/80* (2006.01)
*E21B 43/267* (2006.01)
*C09K 8/62* (2006.01)

(52) U.S. Cl.
CPC ............. *C09K 8/62* (2013.01); *C09K 8/805* (2013.01)

(58) Field of Classification Search
None
See application file for complete search history.

(56) References Cited

U.S. PATENT DOCUMENTS

| | | | |
|---|---|---|---|
| 3,929,191 A | 12/1975 | Graham et al. | |
| 5,177,157 A | 1/1993 | Akamatsu | |
| 5,376,629 A | 12/1994 | Smith | |
| 5,401,719 A | 3/1995 | DeBeer | |
| 5,420,174 A * | 5/1995 | Dewprashad | C09K 8/685 507/220 |
| 5,712,228 A | 1/1998 | Patel | |
| 5,799,705 A | 9/1998 | Friedrich et al. | |
| 5,864,000 A * | 1/1999 | Lightbody | C08G 77/42 524/837 |
| 6,059,034 A | 5/2000 | Rickards et al. | |
| 6,330,916 B1 | 12/2001 | Rickards et al. | |
| 6,342,303 B1 | 1/2002 | Dopico et al. | |
| 6,528,157 B1 | 3/2003 | Hussain et al. | |
| 6,664,343 B2 | 12/2003 | Narisawa et al. | |
| 7,135,231 B1 | 11/2006 | Sinclair et al. | |
| 7,322,411 B2 | 1/2008 | Brannon et al. | |
| 7,541,318 B2 | 6/2009 | Weaver et al. | |
| 7,737,292 B2 | 6/2010 | Ackermann | |
| 7,789,147 B2 | 9/2010 | Brannon et al. | |
| 7,845,409 B2 | 12/2010 | Shinbach et al. | |
| 7,883,740 B2 | 2/2011 | Nguyen et al. | |
| 8,076,438 B2 | 12/2011 | Ackermann | |
| 2003/0186820 A1 | 10/2003 | Thesing | |
| 2004/0241331 A1 | 12/2004 | Durairaj et al. | |
| 2007/0166475 A1* | 7/2007 | Fournier | C14C 9/00 427/412 |
| 2012/0088699 A1* | 4/2012 | Qin | E21B 43/267 507/205 |
| 2013/0081812 A1* | 4/2013 | Green | C09K 8/805 166/280.1 |

FOREIGN PATENT DOCUMENTS

| | | |
|---|---|---|
| CN | 101586024 A | 11/2009 |
| CN | 102660245 A | 9/2012 |
| EP | 0423476 A2 | 4/1991 |
| WO | 97/19977 A1 | 6/1997 |

* cited by examiner

*Primary Examiner* — Jeffrey Washville
(74) *Attorney, Agent, or Firm* — Brooks Kushman P.C.

(57) ABSTRACT

Proppant particles coated with an arylolic resin/silicone resin copolymer, wherein the silicon resin contains D units and T units, are suitable for fracturing operations in geological formations and retain their deformability over time without becoming excessively brittle.

9 Claims, No Drawings

OIL AND GAS WELL PROPPANTS OF SILICONE-RESIN-MODIFIED PHENOLIC RESINS

BACKGROUND OF THE INVENTION

1. Field of the Invention

The field of the invention pertains to organic resin-coated proppants for use in fracturing subterranean geological formations to stimulate oil and gas production.

2. Description of the Related Art

Hydraulic fracturing, or "fracking" is a now old technique which has been used to stimulate oil and gas recovery. A fluid containing solid particles is injected into the oil- or gas-bearing (or both) formation to fracture the rock in the hydrocarbon-bearing zone. By such means, "clear" passages are created which allow the hydrocarbon and associated water, if present, to flow more rapidly to the well bore. This technique is becoming more widely used in shale formations where vertical movement through shale layers is very low.

Proppants are used in the fracturing fluid to ensure that the fractures remain open to flow. For this purpose, coarse sand and gravel have been used, as well as ceramic proppants. Unfortunately, these are somewhat brittle materials which can be crushed at the high pressures of the subterranean formations, thus reducing the fracture width as well as generating fines which can plug open spaces between remaining proppant particles.

Thus, fracture conductivity may be reduced by small proppants or fines. In fracture conductivity testing using proppants confined between sandstone cores, embedment of proppant into the core is frequently observed after exposure to elevated stress. In the process of embedment, spalling of fines from the rock is displaced into the proppant pack. Proppant pack conductivity damage from embedment results in loss of proppant pack width as the proppant embeds into the rock and proppant pack pore throats are plugged by displaced formation fines. The pack permeability is thereby reduced.

A second source of fines results from proppant crushing. Such fines are generated at the fracture-face to proppant pack interface as in situ closure stresses acting upon the fracture cause failure of the proppant, the formation rock, or both. Such stresses may cause the proppant to be compressed together such that fines are generated from the proppant pack and/or reservoir matrix. Further, fines composed of formation material (e.g., shale, sand, coal fines, etc.) may present similar problems and may be produced, for example, within the fractured formation due to stresses and forces applied to the formation during fracturing.

Proppant packs containing both sand and a deformable polymer proppants substantially reduce proppant crushing. Such proppant packs are disclosed in U.S. Pat. Nos. 6,059, 034 and 6,330,916. In addition to sand, such proppant packs contain deformable additives which act as a cushion and minimize the point stresses applied to the proppant and limit crushing of the sand. However, at elevated stress levels, the permeability and porosity levels of such proppant packs are compromised by embedment and spalling. The proppants used in these references consist of a traditional proppant, i.e. sand, and a deformable particulate material such as polystyrene/divinylbenzene beads.

A further concept for improving the conductivity of proppants is to coat the proppant particles with an organic resin. In U.S. Pat. No. 3,929,191, sand or beads are coated with a fusible, i.e. thermoplastic (non-crosslinked) phenolic resin and injected into the geological formation. The phenolic resin then crosslinks in situ to an infusible state, and agglomerates of the proppants also form as a result. In the process for making such proppants, it is disclosed to employ a very minor amount of aminoalkylalkoxysilane as a coupling agent. However, the small amount of coupling agent used cannot form a silicone resin, and is used only to increase adherence of the phenolic resin to the sand particles. Phenolic resin coated proppants have been widely used, but suffer from the disadvantage that they continue to crosslink under the harsh subterranean conditions, becoming brittle. They may then fracture, generating the problems addressed previously.

In U.S. Pat. No. 7,883,740, it is proposed to coat proppant particles with a two layer coating, the first layer of a curable resin which is allowed to cure, followed by deposition of a second layer which is also allowed to cure. The two layers may be formed of the same curable resin. Such particles have the unwanted characteristic of shedding their outer layer, generating deformable fines which can substantially reduce porosity.

U.S. Pat. No. 7,322,411 discloses forming deformable proppants by coating proppant particles with a deformable polymer. Preferred polymers are phenol/formaldehyde resins, melamine/formaldehyde resins, and polyurethane resins. The formaldehyde-based resins have a tendency, as explained earlier, to continue to crosslink and ultimately become brittle. Polyester polyol-based polyurethane resins are unstable with respect to hydrolysis, and both these and the more hydrolysis-stable polyether-based polyurethanes tend to be expensive.

In U.S. published application 2003/0186820 A1, an in situ method of producing elastomer coated proppants is disclosed, wherein a silicone elastomer-forming component in liquid form is injected into the formation together with the particulate proppant, and polymerization within the formation enables the formation of a flexible and coherent mass. The varied underground conditions create problems with such an approach, and if too elastomeric, the gel-like masses can plug the formation rather than creating the desired hydrocarbon flow paths. Moreover, the curable silicone elastomer precursors are expensive.

It would be desirable to provide proppants which are deformable and whose conductivity is thus long lasting, while maintaining the benefits of the ease of production and cost-effectiveness of phenolic coated proppants.

SUMMARY OF THE INVENTION

It has now been surprisingly discovered that stable, long lasting and cost-effective proppants suitable for use in fracturing operations can be provided by coating proppant particles with a copolymer of an arylolic resin and a silicone resin containing both D and T units.

DETAILED DESCRIPTION OF THE PREFERRED EMBODIMENTS

The present invention thus pertains to particulate proppants coated with arylolic resin/silicone resin copolymers to form "deformable," crush and fracture resistant, coated proppants for use in fracturing subterranean formations.

By "proppant particle" is meant a generally hard, high modulus material commonly used in proppants. Examples include sand, gravel, ground rock such as limestone, marble, dolomite, granite, etc., glass beads, ceramic particles, ceramic beads, and the like. This list is exemplary and not limiting. It is preferred that the proppant particles be of a substantially spherical shape, and in this regard, coarse sand is preferred. Glass beads and microballoons are likewise preferred. As the average particle size of the proppant particles decreases, greater preference is given to substantially spherical particles, i.e. particles with an aspect ratio of less than 2:1 (length/diameter). This is to ensure maintenance of space for hydrocarbon flow between the particles. For coarser particles, the shape is less relevant.

By "coated proppant particles" is meant proppant particles which have been coated with an arylolic resin/silicone resin copolymer.

By "deformable" it is meant that the proppant particulates of the proppant pack substantially yield upon application of a minimum threshold level to point to point stress. The in situ deformation of the proppants form multi-planar structures or networks and thus serve as a cushion to prevent grain-to-grain contact and absorb stress. Such cushioning prevents the proppant from shattering or breaking due to stress (including stress induced by stress cycling). As a result, less fines are generated and permeability and/or conductivity is maintained. Such reduction in fines generation further permits the extension of the closure stress range in which the proppant pack may be used.

By "arylolic resin" is meant the various phenol/formaldehyde condensates, melamine/formaldehyde condensates, and melamine/phenol/formaldehyde condensates and similar formaldehyde condensation polymers. Such polymers are well known and are available in the form of both high and low molecular weight varieties from a number of providers, for example Georgia Pacific and Plastics Engineering Co. In addition to phenol and melamine as formaldehyde-reactive starting materials, other phenols such as ortho- and meta-cresol can be used. Such resins are still "arylolic/formaldehyde" resins as that term is used herein, as are also the melamine/formaldehyde resins which are produced in very similar fashion and have similar properties. It is also possible that the arylolic/formaldehyde resins contain a minority of other functional groups such as epoxy groups, although this is not preferred.

The molecular weight and degree of crosslinking of the arylol-formaldehyde resins can be increased by heating, especially while removing water as an elimination product of condensation, or by reaction with a curing agent such as hexamethylenetriamine. In any case, the molecular weight and degree of crosslinking should not be so high so as to prevent efficient coating of the proppant particles. The resins may be novolac resins or resole resins. Reference may be had to A. Gerdziella et al., *Phenolic Resins: Chemistry Applications, Standardization, Safety and Ecology*, 2d Ed., Springer, 2000, and to W. Hesse, "Phenolic Resins" in Ullmann's Encyclopedia of Industrial Chemistry, 2002, Wiley-VCH, Weinheim.

By "silicone resin" in the context of the present invention is meant an organopolysiloxane containing D and T units, and optionally M and Q units as well. These units are defined as in Walter Noll, Chemistry and Technology of Silicones, Academic Press, 1968, page 3, as $R_3SiO_{1/2}$ (M); $R_2SiO_{2/2}$; (D); $RSiO_{3/2}$ (T) and $SiO_{4/2}$ (Q); where R is an organic radical, preferably an alkyl, alkenyl, cycloalkenyl, aryl, alkaryl, or aralkyl radical, which may optionally be substituted by non-interfering substituents such as cyano, halo, alkoxy, polyoxyalkyloxy, and the like. R may also be an alkoxy group or a silicon-based hydroxyl group, which provide for reactivity, particularly reactivity with compounds bearing hydroxyl groups, such as arylolic/formaldehyde resins. The presence of alkoxy and/or silicon-bonded hydroxyl groups is necessary in the silicone resins of the invention.

When R in the M, D, and T units are alkoxy groups —$OR^1$, $R^1$ is a hydrocarbon group, preferably an alkyl group, and most preferably a $C_{1-4}$ alkyl group. Methyl and ethyl groups are most preferred as $R^1$, and thus preferred alkoxy R groups are the methoxy and ethoxy groups.

When R is not an alkoxy group or silicon-bonded hydroxyl group, it is preferably an alkyl group containing 1-24 carbon atoms, more preferably 1 to 18 carbon atoms, and most preferably 1-4 carbon atoms. The alkyl groups may be linear, branched or on cyclic. Cyclic alkyl groups include $C_{5-6}$ cycloalkyl groups and alkyl-substituted cycloalkyl groups. Examples include the methyl, ethyl, n-propyl, 2-propyl, butyl, cyclohexyl, methylcyclohexyl, cyclohexylmethyl, octyl, isooctyl, and dodecyl radicals. Aryl groups such as phenyl or naphthyl are also preferred, as well as aralkyl groups such as the benzyl group, and alkaryl groups such as tolyl and xylyl groups. Preferred alkenyl groups include the vinyl, allyl, 2-propenyl, and 5-hexenyl radicals. Fluoroalkyl groups such as hexafluoropropyl and perfluoropropyl are useful, but are not preferred, largely due to increased cost. Preferred silicone resins, in addition to alkoxy and or Si—OH groups, contain methyl and phenyl radicals for R, preferably methyl radicals. In certain instances, R may be an aminoalkyl group. Preferred aminoalkyl groups are ω-aminoalkyl groups where the alkyl group is a $C_{1-6}$ alkyl group, and most preferred are the 3-aminopropyl group and the N-(2-aminoethyl)-3-aminopropyl group.

The silicone resins useful in the present invention include D and T units, and optionally M and Q units as well, the sum of all these units totaling 100 mol percent. The M units act as chain terminators, and preferably include trialkoxysiloxy, alkyldialkoxysilyl, and dialkylalkoxysilyl moieties. Trialkylsilyl groups are also useful, particularly when a reduction of alkoxy contact is desirable. Q units may also be present. However, when Q units are present, it is preferred that the proportion of D units increase, otherwise the resulting polymer may be too brittle for its intended use. Less than 30 mol percent of Q units, based on the sum of M, D, Q, and T units are preferably present, more preferably less than 20 mol percent, and yet more preferably less than 10 mol percent. Most preferably, less than 5 mol percent of Q units are present, especially no Q units. The T units are preferably present in amounts of 30-95 mol percent, more preferably 40-85 mol percent, and most preferably 60-85 mol percent. The D units are preferably present in amounts of 5-70 mol percent, more preferably 15-60 mol percent, and most preferably 15-40 mol percent. Higher amounts of D units relative to T units in the above ranges increases the elastomeric nature of the coated proppant, and vice versa.

The silicone resins of the invention are thus highly branched, crosslinked structures which still have elastomeric character due to the presence of the D units in the resin. Such resins are commercially available or can be made by standard methods in silicone resin chemistry, for example by cohydrolysis of the corresponding chlorosilanes or alkoxysilanes. For example, a DT resin can be prepared by condensation of D unit precursor dichlorodimethylsilane and T unit precursor trichloromethysilane. The cohydrolysis is generally conducted in aqueous acidic and alcoholic media, often in the presence of an organic solvent such as toluene, and as a result of the cohydrolysis conditions, the resulting resin will also contain silanol groups and/or alkoxy groups. The amounts of the latter groups can be adjusted by conditions of cohydrolysis and subsequent thermal treatment. A suitable method of cohydrolysis may be found in U.S. Pat. Nos. 7,737,292 and 8,076,438 which are incorporated for this purpose by reference. A useful commercial silicone resin is Silres® SY231 available from Wacker Chemicals, Adrian, Mich. A suitable hydroxy and aminoalkyl-functional silicone resin is Silres® HP 2000, and a high T-content resin is Silres® MSE 100, both available from the same source.

The reaction of the organosilicon compound with the arylolic resin may be accomplished by various procedures which are known in the art or can be accomplished by methods known in organic chemistry and organosilicon chemistry. Suitable methods are described, for example, in U.S. Pat. Nos. 5,177,157; 5,799,705, and 5,864,000, for example, which are incorporated herein by reference.

In one method, as exemplified in U.S. Pat. No. 5,177,157, the silicone portion of the copolymer is derived by first reacting a trialkoxysilane with a novolac or resole phenolic resin. The alkoxy groups are preferably used in stoichiometric excess. The resulting silane-modified phenolic resin is then hydrolyzed, creating siloxane linkages through condensation of alkoxy groups. This method is not preferred, however, as the resulting copolymer will be more highly crosslinked through condensation of alkoxysilyl groups initially bonded to the phenolic resin, and the condensation of additional unreacted silanes will provide siloxanes with a high proportion of T units and only a low proportion of D units. However, such a method is applicable when a first silane functionalization is effected with a trialkoxysilane or a mixture of trialkoxy- and dialkoxysilanes, followed, after reaction, by a suitable mixture of trialkoxy-, dialkoxy-, and optionally monoalkoxy or tetralkoxy silanes. In this case, the number of D units and T units in the siloxane portion of the copolymer can be adjusted within wide limits. The result in this case is still a phenolic resin modified with an organopolysiloxane (silicone) containing the claimed proportions of D and T units. The monofunctional monoalkoxysilanes can be added during the condensation or after the prior condensation is complete, to act as end capping or chain terminating reagents, which in the latter case can moderate the molecular weight and degree of crosslinking of the polymer, and in the former and latter cases, can render the resultant copolymer less subject to further crosslinking, e.g. after injection of the coated proppant into the geological formation. It is desirable that some residual Si—OH groups and or silicon-bonded alkoxy groups remain in the copolymer prior to coating of the proppant particles, as these facilitate firm bonding to these particles, reducing the risk of shedding of the polymer coat under harsh conditions. This process may be referred to as an in situ copolymer production process. As a variant of such a process, the silanes may also be added during preparation of the arylolic resin, i.e. to the mixture of phenol (or cresol, melamine, etc.) and formaldehyde. As a variant of this method, an initial silanization with alkoxysilane such as methyltrimethoxysilane may be followed by reaction with an Si—OH or alkoxy group-containing oligomeric or polymeric organopolysiloxane.

In order to more predictably tailor the nature of the copolymer, it is preferable that in lieu of the use of reactive silanes followed by one or more condensation steps, that a preformed silicone polymer or oligomer be prepared, which contains the desired ratios of D and T units, and when desired, also M and Q units, these polymers or oligomers having residual Si—OH or silicon-bonded alkoxy functionality. These silicones may also bear, in addition to or in lieu of Si—OH and/or silicon-bonded alkoxy groups, other condensation labile groups such as oximino groups (less preferred) or acyloxy groups such as acetoxy groups. The preparation of such silicone resins, as indicated previously, is known, and many are commercially available, in a wide range of functionalities, content of functional groups, and molecular weights.

Use of preformed silicone resins is thus preferred. The silicone resins may be bonded to the phenolic resin by an in situ method, as previously described, and as disclosed in U.S. Pat. No. 5,864,000, or may be reacted with a preformed phenolic resin, as disclosed in U.S. Pat. Nos. 5,864,000 and 5,799,705.

The amount of the silicone resin contained in the arylolic resin/silicone resin copolymer may vary within rather wide limits. At the lower end of the acceptable range, the amount is dictated by the amount of heat resistance, deformability, and freedom from in situ crosslinking (after injection into the geological formation). At the high end of incorporation, the limitations become too great a degree of deformability, i.e. too "soft" an elastomer, and cost. Phenolic resins are substantially low cost commodities, whereas silanes and silicone resins are more costly. The weight proportion of the silicone resin in the copolymer, whether produced by an in situ or other method, should preferably be between 5 weight percent and 50 weight percent, based on the total weight (calculated as solids, or "neat" polymer), more preferably between 5 weight percent and 45 weight percent, and most preferably between 5 and an integral value between 5 and 15 on the low end of incorporation, and integral values between 45 and 30 weight percent on the high end, the high end being, of course, higher than the low end. A range of 10 to 30 weight percent incorporation is particularly preferred.

The copolymer, depending upon its preparation method, may be obtained as a neat liquid, which is preferred, as a solid, as an aqueous or alcoholic dispersion, or as a solution in organic solvent. Neat liquids or solutions of liquid copolymer or solid copolymer in organic solvent are preferred. If the copolymer is a liquid after preparation, it is a curable liquid copolymer which is cured to a solid during the overall coating procedure.

Following preparation of the copolymer, the copolymer, in one of the forms identified above, is used to coat proppant particles. Any method of coating may be used, for example, but not by limitation, pan coating, fluidized bed coating, coating in mixers, spray towers, or the like. Whichever method of coating is utilized, any organic solvent is preferably removed, and the coated proppant particles are recovered in dry form or in an aqueous suspension.

The coating may be applied in one or more layers. If more than one layer is used, it is preferable that the preceding layer is not substantially cured prior to coating with the subsequent layer. In this manner, the two or more layers are chemically bonded to each other, and will resist shredding.

A preferred method of coating is to introduce the proppant particles into a rotating coater or fluidized bed, and meter the coating components into the bed. A continuous procedure for coating may thus be established. The amount of polymer coating on the proppant particles is to some extent related to the temperatures and pressures expected to be encountered in the geological formation. Shallow wells may have a temperature less than 55° C., for example, and relatively low pressure as well. Moderate pressure stress of 100 psi to 5000 psi ordinarily dictates a thicker coating, whereas higher temperatures, which may range above 100° C. and pressures which may easily reach 15,000 psi ordinarily dictate a thinner coating. Coating thickness, as reflected by weight percent of copolymer coating relative to the total weight of proppant particles plus coating, generally ranges from 0.2 to 20 weight percent, more preferably 0.2 to 10 weight percent, yet more preferably 1 to 10 weight percent, and most preferably about 2 to 8 weight percent.

Aggregates of the coated proppant particles are also useful. In this sense, an aggregate is a plurality of coated proppant particles reversibly bound together in an "aggregate." The aggregates may regenerate individual or smaller clusters of coated proppant particles during use, for example prior to or during injection into the well bore, or within the subterranean formation due to temperature and pressure stress.

The coated proppant particles may be formed into aggregates in a conventional manner. For example, coated proppant particles may be heated to elevated temperatures at which the polymer coating softens or becomes tacky, and the coated proppant particles thus "stick together," optionally aided by pressure. The aggregates may form as a large coherent mass which is subsequently crushed into desired aggregate sizes.

The aggregates may also be prepared from a mixture of coated proppant particles and an adhesive or softenable polymer, similar to the process described above, and then crushed if necessary. The polymers may be deformable polymers of numerous chemical categories, and may be in any form, i.e. powder, spheres, microballoons, etc. The adhesive may be water soluble or water softenable. Examples of water soluble adhesives, which will begin release of coated proppant particles shortly after contact with aqueous fluids include polyvinyl alcohols, including partially hydrolyzed polyvinyl acetates and the like, polyacrylic acid polymers and salts thereof, polyvinylpyrrolidones, etc. The adhesive should not be so strong or water-insensitive that the aggregates cannot break up to form smaller clusters and/or individual coated proppant particles during use.

The copolymer coated proppant particles preferably meet the API (American Petroleum Industry) standards for sphericity and/or fines.

API RP numbers 56 and 58 describe the minimum standard for sphericity as at least 0.6 and for roundness as at least 0.6. As used herein, the terms "sphericity" and "roundness" are defined as described in the API RP's and can be determined using the procedures set forth in the API RP's.

API RP 56 also sets forth some commonly recognized proppant sizes as 6/12, 8/16, 12/20, 20/40, 30/50, 40/70, and 70/140 (all values expressed as U.S. Mesh). Similarly, API RP 58 also sets forth some commonly recognized gravel sizes as 8/16, 12/20, 16/30, 20/40, 30/50, and 40/60 (all values expressed as U.S. Mesh). The API RP's further note that a minimum percentage of particulates that should fall between designated sand sizes and that not more than 0.1 weight % of the particulates should be larger than the larger sand size and not more than a maximum percentage (1 weight % in API RP 56, and 2 weight % in API RP 58) should be smaller than the small sand size. Thus, for 20/40 proppant, no more than 0.1 weight % should be larger than 20 U.S. Mesh and no more than 1 weight % smaller than 40 U.S. Mesh.

API RP's 56 and 58 describe the minimum standard for proppant and gravel turbidity as 250 FTU or less. API RP 56 describes the minimum standard for acid solubility of proppant as no more than 2 weight % loss when tested according to API RP 56 procedures for proppant sized between 6/12 Mesh and 30/50 Mesh, U.S. Sieve Series and as no more than 3 weight % loss when tested according to API RP 56 procedures for proppant sized between 40/70 Mesh and 70/140 Mesh, U.S. Sieve Series. API RP 58 describes the minimum standard for acid solubility of gravel as no more than 1 weight % loss when tested according to API RP 58 procedures. API RP 56 describes the minimum standard for crush resistance of proppant as producing not more than the suggested maximum fines as set forth in Table 1, below, for the size being tested:

TABLE 1

Suggested Maximum Fines for Proppant Subjected to Crushing Strength

| Mesh Size (U.S. Sieve Series) | Crushing Force (lbs) | Stress on Proppant (psi) | Maximum Fines (% by weight) |
|---|---|---|---|
| 6/12 | 6,283 | 2,000 | 20 |
| 8/16 | 6,283 | 2,000 | 18 |
| 12/20 | 9,425 | 3,000 | 16 |
| 16/30 | 9,425 | 3,000 | 14 |
| 20/40 | 12,566 | 4,000 | 14 |
| 30/50 | 12,566 | 4,000 | 10 |
| 40/70 | 15,708 | 5,000 | 8 |
| 70/140 | 15,708 | 5,000 | 6 |

Similarly, API RP 58 describes the minimum standard for crush resistance of gravel as producing not more than the suggested maximum fines as set forth in Table 2, below, for the size being tested:

TABLE 2

Suggested Maximum Fines for Gravel Subjected to Crushing Strength

| Mesh Size (U.S. Sieve Series) | Crushing Force (lbs) | Stress on Proppant (psi) | Maximum Fines (% by weight) |
|---|---|---|---|
| 8/16 | 6,283 | 2,000 | 8 |
| 12/20 | 6,283 | 2,000 | 4 |
| 16/30 | 6,283 | 2,000 | 2 |
| 20/40 | 6,283 | 2,000 | 2 |
| 30/50 | 6,283 | 2,000 | 2 |
| 40/60 | 6,283 | 2,000 | 2 |

The proppants may be tested in situ or ex situ to determine their suitability for use in various geological formations.

As is well known in the art, the short-term conductivity of a particulate used in a proppant pack can be illustrated using an American Petroleum Institute ("API") approved simulated fracture cell, according to the general procedures specified more particularly in the "Recommended Practices for Evaluating Short-Term Proppant Pack Conductivity," API Recommended Practice 61 (RP 61) First Edition, Oct. 1, 1989.

According to this general procedure, the simulated fracture cell uses two cores of a representative subterranean formation.

The cores are positioned in the cell to define a proppant bed size of about 7 inches (18 cm) in length, about 1.5 inches (3.8 cm) in width, and about 0.25 inches (0.6 cm) in space between the two cores. Such a cell simulates a fracture created in a subterranean formation.

The proppant bed in the API cell is initially prepacked with the particulate and any other material to be tested. The cell is pre-packed by introducing the coated particulate into the cell in a fluid suspension. The fluid used can simulate the type of fluid that can be used for introducing the particulate or coated particulate into a subterranean formation.

The API cell is fitted with a 0.3 inch (0.8 cm) diameter hole at one end to simulate a perforation. This is fitted with a screen to maintain the proppant pack in place.

According to the API procedure, the flowing medium can be water, diesel, or kerosene, or other well fluids. The flowing medium is selected to simulate well conditions. The conductivity of a proppant pack can be significant different for different types of flowing medium.

The API cell is placed in a hydraulic press to apply stress loadings to simulate the stress loadings in a fracture formed in a subterranean formation. According to the general testing procedure, the conductivity of the pack can be measured at any practical and desirable stress loadings, usually starting at about 1,000 psi.

Other factors that can impact the measured conductivity of a proppant pack include, for example, temperature, and even merely the passage of time under an applied closure stress and the other conditions. The different experience of the technician running the tests can also be a factor.

Thus, for best results, the conductivity testing should be conducted in the same way each time. Furthermore, because of the complexity of the systems being simulated, there is some natural variability from one test to the next. For example, conductivity test measurements may be expected to vary in the range of about 10% to 20% from one test to the next. Thus, it is generally preferred, although not always necessary, that the testing should be repeated at least two and more preferably at least three times and an average of the conductivity measurements be used. If a particular test out of a number of tests is shown to likely be an aberration using widely accepted statistical analysis techniques, such a result can properly be excluded from the average of the measurements. While these conductivity testing procedures do not provide absolutely consistent measurements, such testing is widely accepted in the art as being at least reasonably reliable and at least reasonably consistent for the purposes of the testing.

At a minimum, a particulate for use as a proppant should be sufficiently strong to be able to withstand substantial crushing under the stress cycles of the subterranean formation into which it is intended to be deposited. Otherwise, as the particulate begins to be crushed under the increasing stress loadings, the crushed pieces of particulate will begin to plug the pore throats between the uncrushed pieces of the particulate, which will reduce the conductivity of the proppant pack. Ultimately, the particulate would be ground to dust.

The strength of a particulate is known in the art as "crush resistance," which can be measured according to an official API RP 56/58 procedure. Of course, certain types of particulate materials are much stronger than others. The crush resistance of a particulate is not only dependent on what the particulate is, but also on the size of the particulate. All else being equal, the smaller the particle size, the greater the crush resistance. For example, 12/20 mesh size bauxite would be expected to have a lower crush resistance, and 40/60 mesh size bauxite would be expected to have a higher crush resistance than 20/40 bauxite. Crush resistance is known to also be dependent on other factors, such as temperature and the flowing medium used in the test.

Thus, for example, a typical sand, such as 20/40 mesh Brady or Ottowa sand, is known to have a crush resistance in the range of about 2,000 psi to about 3,000 psi. On the other hand, 20/40 mesh sintered bauxite can withstand a stress loading of in the range of about 8,000 psi to about 14,000 psi without substantial crushing of the particulate. Thus, bauxite could be used as a proppant in a subterranean formation that is expected to subject the particulate proppant to higher stress loadings than sand would be able to withstand. Crush resistance ranges for bauxite are published by Carbo Ceramics, in its "Technical Information" handbook dated 1995.

EXAMPLES

Uncoated 20/40 mesh white sand proppant particles are tested with and without phenolic resin coating, and with copolymer coatings prepared by reacting a phenolic resin with various silicone resin polymers containing alkoxy groups.

Comparative Example 1

White sand of 20/40 mesh is coated with a novolac phenolic resin in an amount of about 3 weight percent based on the total weight of the coated proppant. The coated proppant is analyzed for crush force and fines generation, both as initially prepared and after oven aging at 149° C. (300° F.) for six months.

Example 2

Comparative Example 1 was repeated, but the phenolic resin was replaced with a phenolic resin modified by reaction with 20 weight percent, based on the weight of the resin, of an alkoxy-functional silicone resin available from Wacker Chemical as Silres® SY231 silicone resin.

Example 3

Comparative Example 1 was repeated, but the phenolic resin was replaced with a phenolic resin modified by reaction with 20 weight percent, based on the weight of the resin, of an aminoalkyl- and alkoxy-functional silicone resin available from Wacker Chemical as Silres® HP2000.

Example 4

Comparative Example 1 was repeated, but the phenolic resin was replaced with a phenolic resin modified by reaction with 20 weight percent, based on the weight of the resin, of an alkoxy-functional silicone resin available from Wacker Chemical as Silres® MSE 100 and with a silanol-functional silicone fluid F1006.

Compared to untreated white sand, the phenolic resin coated sand (Comparative Example 1) has superior crush force and less fines generation, but the crush force decreases upon aging and fines generation increases. Examples 2, 3, and 4 all have higher crush resistance than white sand, less fines generation, and are superior in these properties after aging, as compared to the proppant particles coated with phenolic resin only.

In the foregoing Specification, unless indicated to the contrary, any numerical value stated also includes a disclosure of greater than that amount, greater than or equal to that amount, less than that amount, or less than or equal to that amount when appropriate. Thus for example, the numeral 30 at the high end of a numerical range also includes <30 and ≤30.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Polymer-coated proppant particles suitable for use in fracturing operations in subterranean geological formations, comprising:
   inorganic proppant particles coated with at least one preformed arylolic resin/silicone resin copolymer,
   wherein
   the arylolic resin of the copolymer comprises a condensate of formaldehyde with at least one of phenol, cresol, or melamine, and
   the silicone resin of the copolymer is an organopolysiloxane comprising D units $R_2SiO_{2/2}$, T units $RSiO_{3/2}$, and optionally M units $R_3SiO_{1/2}$ and Q units $SiO_{4/2}$, wherein R is an organic group including a $C_{1-18}$ alkyl group, $C_{2-18}$ alkenyl group, $C_{5-6}$ cycloalkyl group, $C_{6-10}$ aryl group, $C_{7-14}$ alkaryl group, or $C_{7-14}$ arylalkyl group, the silicone resin having Si—OH groups, Si-bonded alkoxy groups, or mixtures thereof, wherein the mol percent of T units is greater than the mol percent of D units, and wherein less than 30 mol percent of Q units are present based on the sum of M, D, T, and Q units.

2. The polymer-coated proppant particles of claim 1, wherein the resin/silicone resin copolymer contains from 5 weight percent to 50 weight percent silicone resin based on the total weight of the copolymer.

3. The polymer-coated proppant particles of claim 1, wherein the arylolic resin/silicone resin copolymer contains from 10 weight percent to 30 weight percent silicone resin based on the total weight of the copolymer.

4. The polymer-coated proppant particles of claim 1, wherein the arylolic resin/silicone resin copolymer is present in an amount of about 0.2 weight percent to about 20 weight percent based on the total weight of the polymer coated proppant particles.

5. The polymer-coated proppant particles of claim 1, wherein the arylolic resin/silicone resin copolymer is present in an amount of about 1 weight percent to about 10 weight percent based on the total weight of the polymer coated proppant particles.

6. The polymer-coated proppant particles of claim 1 wherein the arylolic resin is a phenolic resole resin or a phenolic novolac resin.

7. The polymer-coated proppant particles of claim 1, wherein all R are selected from the group consisting of methyl, phenyl, and mixtures thereof, and the alkoxy groups are selected from the group consisting of methoxy, ethoxy, and mixtures thereof.

8. The polymer-coated proppant particles of claim 1, wherein the inorganic proppant particles are selected from the group consisting of gravel, sand, ceramic particles, and mixtures thereof.

9. The polymer-coated proppant particles of claim 1, having a single coating.

* * * * *